Sept. 17, 1963   G. E. FLINN   3,103,991
SELF-ADJUSTING BRAKE MECHANISM
Filed May 26, 1961
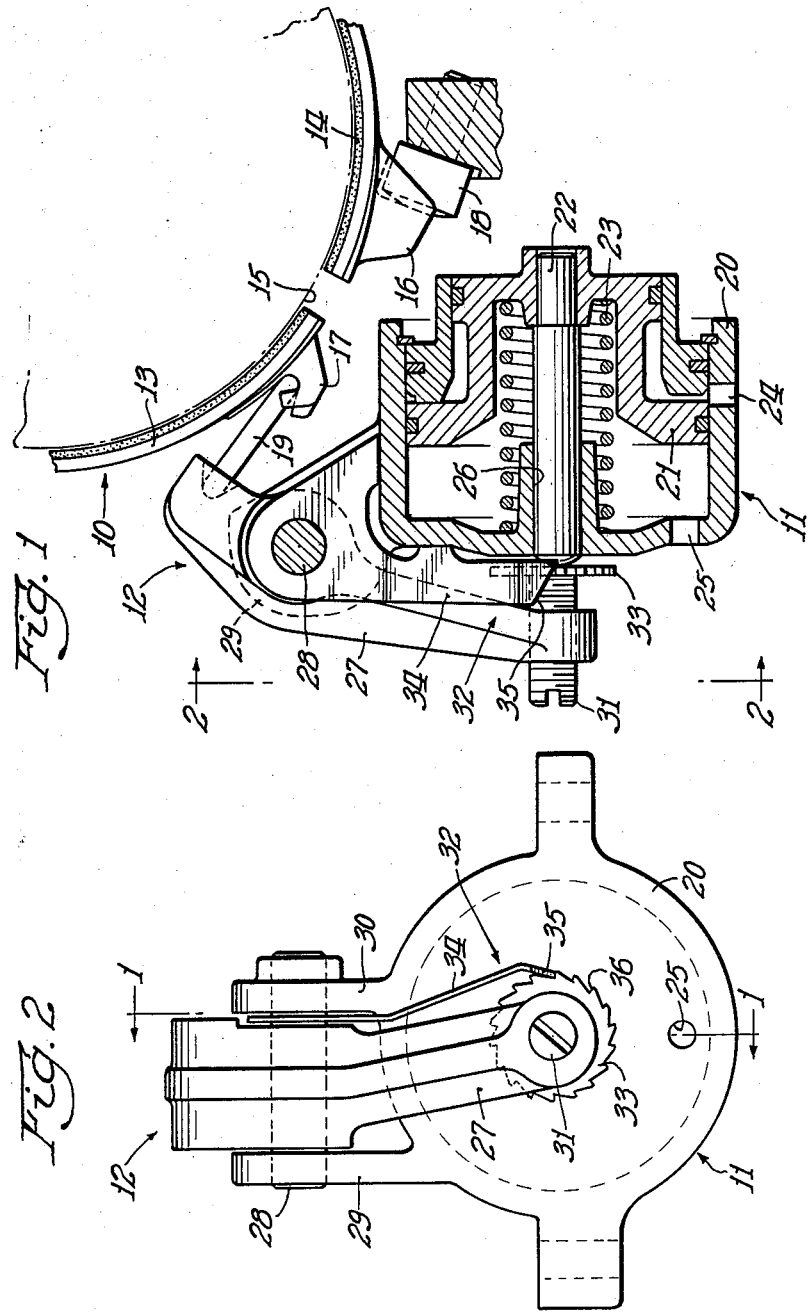
Inventor:
George E. Flinn
By: Ray E. Snyder
Atty.

United States Patent Office 3,103,991
Patented Sept. 17, 1963

3,103,991
SELF-ADJUSTING BRAKE MECHANISM
George E. Flinn, Muncie, Ind., assignor to Borg-Warner Corporation, a corporation of Illinois
Filed May 26, 1961, Ser. No. 112,977
1 Claim. (Cl. 188—77)

This invention relates to a self-adjusting mechanism for a brake band. The mechanism of the present invention is primarily designed to adjust for wear of a brake band of an automatic transmission, but may be used in any application where band type brakes are employed.

Self-adjusting mechanisms that compensate for wear are well known in the art, but are generally quite complicated and unreliable in operation. It is an object of the present invention to provide a simplified brake adjusting mechanism that is reliable in operation and can be incorporated into an existing structure with minimum design changes.

It is a more particular object to provide an adjusting mechanism for a brake of the band type including a servomotor having a movable shaft and an interconnecting linkage for applying the band, and also including a threaded adjusting screw having a ratchet wheel mounted thereon and adapted to cooperate with the movable shaft and with a cam blade for adjusting the movement of the linkage to compensate for wear of the brake band.

Other objects and features of the invention will be readily apparent to those skilled in the art from the specification and appended drawings illustrating certain preferred embodiments in which:

FIG. 1 is a view of a brake band and a hydraulic servo motor for applying the band shown partially in section and including the adjusting mechanism of the present invention; and FIG. 2 is a view taken on line 2—2 of FIG. 1.

Referring to the drawings, the brake mechanism shown includes a brake band 10, a hydraulic servo motor 11 and a linkage mechanism 12 interconnecting the servo motor 11 with the band 10. The brake band 10 comprises a resilient metal strip 13 carrying a strip of friction material 14 which is adapted to engage the outer periphery of a brake drum 15. Lugs or flanges 16 and 17 are attached to each end of the band 13. The flange 16 is anchored to the housing of the transmission by any suitable means 18, and the flange 17 is connected to a strut 19 which is adapted to be acted upon by the linkage mechanism 12.

The servo motor 11 comprises a cylindrical casing 20, a movable piston 21 disposed within the casing 20, a connecting shaft 22 attached to the piston 21, and the return spring 23. The piston 21 is adapted to be moved under the influence of hydraulic pressure supplied through a port 24 from any suitable source (not shown). Additional means may also be provided to supply fluid pressure to the opposite side of the piston 21 through a port 25 from the fluid source (not shown). The connecting shaft 22 extends through an opening 26 formed in the casing 20 and is adapted to act upon the linkage mechanism 12 for engaging the band 10.

The linkage mechanism 12 includes a lever or rocker arm 27 pivotally mounted on a pin 28. The pin 28 is supported by two flanges 29 and 30 formed integrally with the casing 20. The rocker arm 27 carries a threaded adjusting screw 31 on one end and is formed with a recess on its other end for receiving the strut 19. The adjusting screw 31 makes lost motion contact with the connecting shaft 22 of the servo motor 11.

The self-adjusting mechanism is designated generally by the numeral 32 and comprises a ratchet wheel 33 fixedly attached to the screw 31 and a cam blade 34 mounted on the pin 28. The blade 34 may be a strip of resilient material and is formed with a cam surface 35 adapted to contact the teeth 36 of the ratchet wheel 33.

In operation, the brake band 10 is applied by supplying fluid pressure through the port 24 of the servo motor 11. The piston 21 is moved under the influence of hydraulic pressure and moves the connecting shaft 22 axially outward. The shaft 22 contacts the end of the screw 31 and causes the rocker arm 27 to pivot about the pin 28. The motion of the arm 27 is transmitted through the strut 19 and forces the band 10 into engagement with the drum 15. Through continued use, the friction band 14 gradually wears away, and the stroke of the connecting shaft 22 increases to provide the additional movement of the rocker arm 27 necessary to engage the band 10. The resiliency of the band 13 moves the linkage 12 through a return stroke.

The ratchet wheel 33 and screw 31 are moved axially outward during each stroke by the connecting shaft 22, while the cam blade 34 remains stationary with respect to the casing 20. The cam blade 34 is biased or disposed to contact the teeth 36 and at some stage of operation, the stroke of the connecting shaft 22 will increase sufficiently so that the cam surface 35 engages the next succeeding tooth 36 of the ratchet wheel 33. During the return stroke, the tooth 36 slides down along the cam surface 35 and the ratchet wheel 33 and screw 31 are turned through the angular displacement defined by the tooth 36. The screw 31 is threaded so that this angular motion causes it to be moved axially inward toward the servo motor 11. The amount of pivotal motion of the rocker arm 27 necessary to engage the brake band 10 is thereby reduced.

This adjustment of the screw 31 is maintained until the friction band 14 wears sufficiently to cause the motion of the connecting shaft 22 to increase again and permit the cam blade 34 to engage the next tooth 36 on the ratchet wheel 33.

There has been provided by this invention an improved adjusting mechanism adapted to take up or compensate for wear of the friction band of a brake. The mechanism is self-adjustable to take up the amount of lost motion of the connecting linkage between the brake and the servo motor for operating the brake. While the invention has been shown and described in combination with a hydraulic servo motor, it is to be understood that this mechanism would be equally useful with a manually operated or electrically operated brake energizing device.

While certain preferred embodiments of the invention have been specifically disclosed, it is understood that the invention is not limited thereto, as many variations will be readily apparent to those skilled in the art and the invention is to be given its broadest possible interpretation within the terms of the following claim.

I claim:

A self-adjusting mechanism for a brake band which is engaged by a piston operated device having a movable connecting shaft that moves outwardly upon an application stroke and inwardly upon a return stroke and a frame, the combination of a strut and rocker arm linkage means interconnecting the brake band with the connecting shaft of said piston operated device, said rocker arm being pivotally mounted on the frame of said piston operated device, an adjusting screw carried by said rocker arm and positioned in abutting engagement with the connecting shaft of said piston operated device, said adjusting screw being moved outwardly with respect to said piston operated device upon an application stroke, ratchet means fixedly attached to said adjusting screw, and cam means fixedly mounted on the frame of said piston operated device adjacent said pivotally mounted rocker arm, said cam means contacting said ratchet means, said cam means becoming operative after a predetermined outward movement of said ratchet means on said adjusting screw to effect rotation of said ratchet on the return stroke of said connecting shaft to thereby turn the adjusting screw and shorten the return stroke to compensate for wear of the brake band.

References Cited in the file of this patent

UNITED STATES PATENTS 2,677,441 Roberts _____ May 4, 1954
2,981,381 Swift _____ Apr. 25, 1961